(12) United States Patent
Muraoka

(10) Patent No.: US 7,050,389 B2
(45) Date of Patent: May 23, 2006

(54) DC-OFFSET ELIMINATING METHOD AND RECEIVING CIRCUIT

(75) Inventor: Shinya Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 775 days.

(21) Appl. No.: 09/759,219

(22) Filed: Jan. 16, 2001

(65) Prior Publication Data

US 2001/0021232 A1    Sep. 13, 2001

(30) Foreign Application Priority Data

Jan. 17, 2000    (JP)    .............................. 2000/007641

(51) Int. Cl.
*H04J 11/00* (2006.01)
*H04J 3/06* (2006.01)

(52) U.S. Cl. ...................... 370/206; 370/206; 370/516; 375/148; 375/150

(58) Field of Classification Search ................ 370/203, 370/206, 441, 465, 470, 471, 479; 375/235, 375/261, 298, 319; 342/394; 327/307; 332/103, 332/104; 329/304, 310
See application file for complete search history.

(56) References Cited

U.S. PATENT DOCUMENTS 5,459,679 A * 10/1995 Ziperovich ..................... 708/3
5,475,714 A 12/1995 Turner
5,629,960 A 5/1997 Dutkiewicz et al.
5,886,842 A 3/1999 Ziperovich
6,400,778 B1 * 6/2002 Matui .......................... 375/319
6,504,884 B1 * 1/2003 Zvonar ........................ 375/346

* cited by examiner

*Primary Examiner*—Chau Nguyen
*Assistant Examiner*—Soon D. Hyun
(74) *Attorney, Agent, or Firm*—Sughrue Mion, PLLC

(57) ABSTRACT

A DC-offset eliminating circuit changes a coefficient $\alpha$ for determining a DC-offset follow-up speed. The coefficient $\alpha$ is changed to a smaller value or 0 in a case where a signal showing a detection that a reception is ceased, is received from a signal-end detecting circuit, or in a case where a signal for partly turning off the circuits for the reduction of power consumption is received from a control circuit, if the received frame is not destined for the receiver itself. The circuit remains the coefficient $\alpha$ to a smaller value immediately after the reception is resumed. Additionally, the circuit returns the coefficient $\alpha$ to the normal value in response to the reception of a signal showing that an alignment signal is detected immediately after a preamble portion. The circuit then reduces the DC-offset follow-up speed as much as possible at the time when the preamble portion is received, thereby avoiding the DC-offset deviation caused by the preamble patterns.

5 Claims, 9 Drawing Sheets

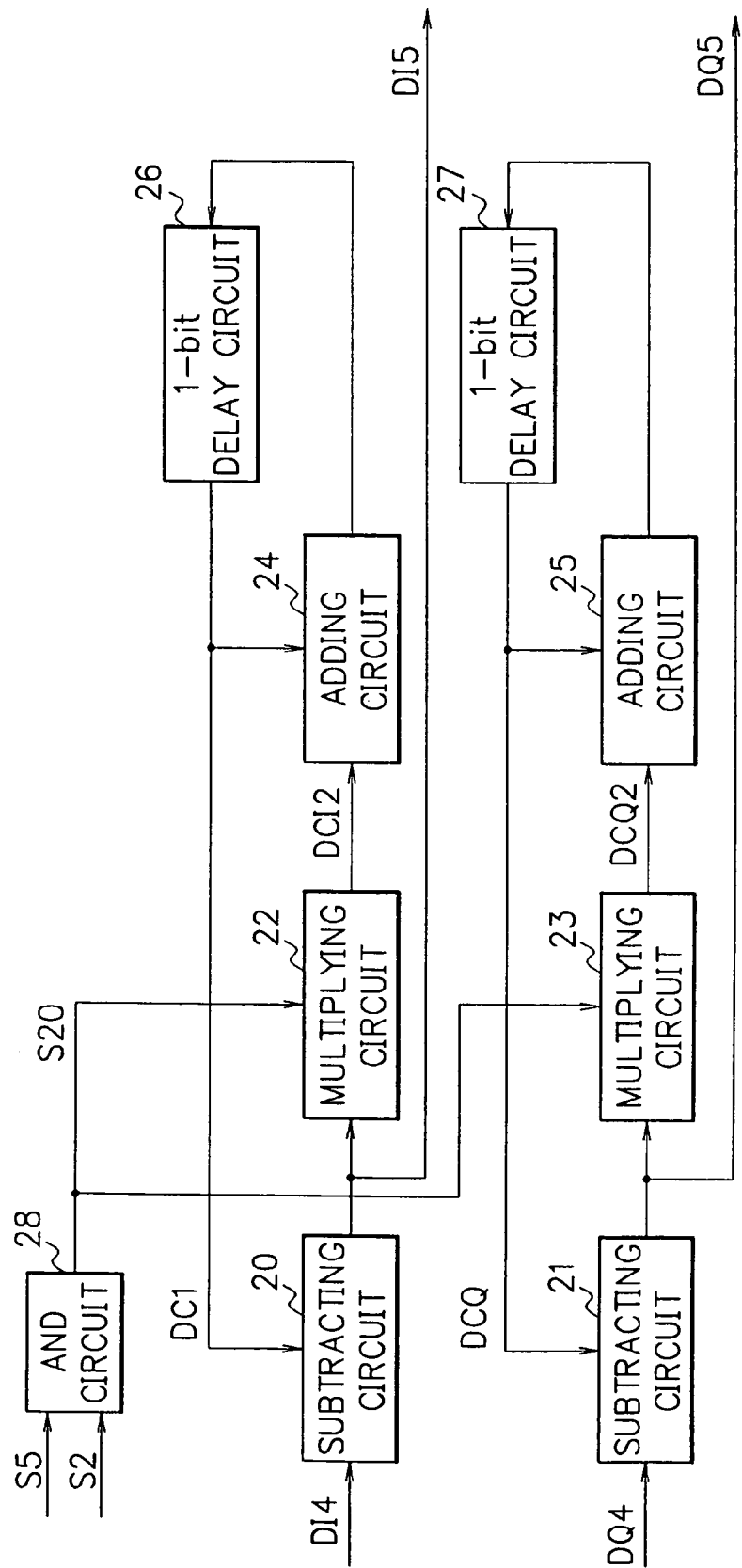
F I G. 2

F I G. 9
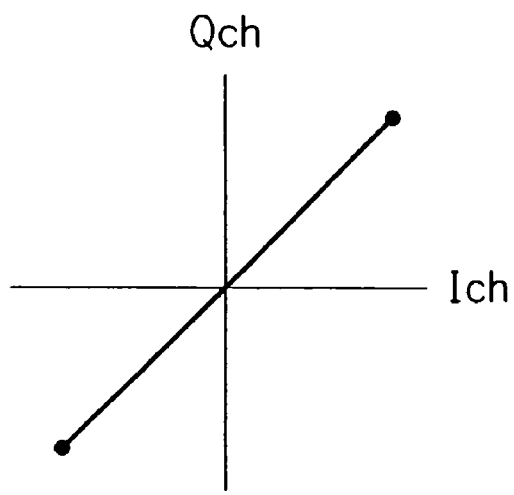
F I G. 10
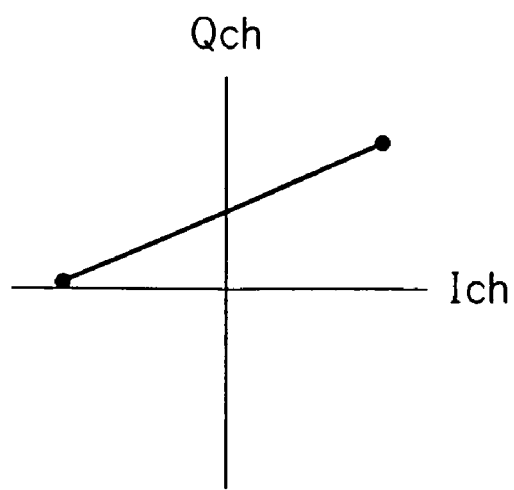

DC-OFFSET ELIMINATING METHOD AND RECEIVING CIRCUIT

BACKGROUND OF THE INVENTION

The present invention relates to a DC-offset eliminating method and a receiving circuit capable of eliminating a DC-offset component contained in a baseband signal after quadrature detection is performed.

DESCRIPTION OF THE RELATED ART

FIG. 4 is a block diagram showing a receiving circuit with a prior-art DC-offset eliminating circuit. The receiving circuit deals with signals forming frame structures as shown in FIGS. 6 and 7, and these signals are received by a plurality of receivers. Each of the receivers analyzes control portions (CONT) 62 and 72 of the frame as shown in FIGS. 6 and 7, thus deciding whether or not the frame is destined or self-addressed for the receiver itself.

Alignment portion (UW) 61 and 71 of the frame includes 20- to 40-bit fixed patterns which indicate boundaries of the frames, and the portion is generally known as a unique word (UW). The control portion (CONT) contains the frame numbers which are cyclic at predetermined intervals and indications with respect to which receiver should receive which frame.

The receiving circuit of each receiver stores timings at which the frame numbers are cyclic. Thereafter, only at the frame timing to perform a receiving operation, a receive control signal S1 output from a control circuit 101 is set to "1", so as to turn on the power to a quadrature detection circuit 1, an analog circuit 2 and an analog to digital (A/D) converting circuit 3. At other frame timings, the receiving circuit sets the receive control signal S1 to "0" in order to turn off the power to these circuits 1 to 3. Such operation (hereinafter referred to as "intermittent reception") therefore serves to reduce the power consumption in the receiving circuit.

Furthermore, data to be sent is exchanged in a transmitting side and in a satellite if data is transmitted via the satellite, only when there exists significant data, otherwise, no data is exchanged. This is for reduction in the power dissipated in the transmitting side and satellite. Accordingly, the intermittent reception as mentioned above is carried out at regular time intervals, while a signal D1 which is input into the receiving circuit of FIG. 4 appears at irregular time intervals. This is hereinafter referred to as activation method.

Signal-end indication portions (END) 64 and 74 of FIGS. 6 and 7 indicate whether or not any signal is sent after the frame (whose length is denoted as T1 in FIGS. 6 and 7). When the received signals are ceased and then the next signal is input, a preamble portion (PA) 70 is added as shown in FIG. 7. In the timing chart of FIG. 8, the input signal D1 denotes a signal which is input according to the activation method. Black portions in the input signal D1 as shown in FIG. 8 correspond to the preamble portion, and signal-end indications (END) are provided in the frames 0, 15 and 201.

The quadrature-detection circuit 1 carries out a quadrature detection at a predetermined radio frequency, on the received signal D1 in the radio frequency band, and converts the signal D1 into signals DI2 and DQ2 in the baseband frequency band. The analog circuit 2 then converts the signals DI2 and DQ2 into signals DI3 and DQ3 respectively, which are suitable for the subsequent A/D converting circuit 3. The A/D converting circuit 3 performs conversion of the analog signals DI3 and DQ3 into digital signals DI4 and DQ4 respectively, to output the results to a DC-offset eliminating circuit 4.

It should be noted that the receive control signal S1 is input to the quadrature-detection circuit 1, the analog circuit 2 and the A/D converting circuit 3, and the power to these circuits is turned on only when the receive control signal S1 is "1" or turned off when the signal S1 is "0". This enables to perform the intermittent reception.

The DC-offset eliminating circuit 4 has a structure as shown in FIG. 5. In FIG. 5, subtracting circuits 20 and 21 subtract from the signals DI4 and DQ4, DC offset values DCI and DCQ which are respectively output from 1-bit delay circuits 26 and 27. As a result, the subtracting circuits output signals DI5 and DQ5 on which a DC-offset elimination has been performed in accordance with the following equations (1) and (2).

$$DI5 = DI4 - DCI \quad (1)$$

$$DQ5 = DQ4 - DCQ \quad (2)$$

With respect to DC-offset values, DCI and DCQ, calculated in the DC-offset eliminating circuit 4, control is made to make these values equal to the sum of DC offset contained in the received signal D1 and DC-offset values contained in the circuits 1 to 3 as shown in FIG. 4.

In multiplying circuits 22 and 23, the operation as depicted in the following equations (3) and (4) is performed:

$$DCI2 = \alpha * DI5 \quad (3)$$

$$DCQ2 = \alpha * DQ5 \quad (4)$$

where $\alpha$ is 0 or a positive follow-up speed coefficient to determine a DC-offset follow-up speed. The larger the follow-up speed coefficient is, the faster the follow-up speed becomes. However, if it is larger, stability will be degraded. Contrary, as the follow-up speed coefficient becomes smaller, the follow-up speed is then decreased. Stability in this case will be improved.

The multiplying circuits 22 and 23 have two types of values, H and L (H>L) as the coefficient $\alpha$. When a frame-continuation detection signal S2 for detecting frame continuation is "1", $\alpha=H$ will hold, which causes the follow-up speed to be increased. When the signal S2 is "0", $\alpha=L$, so that the follow-up speed is decreased.

Adding circuits 24 and 25 respectively add DCI2 and DCQ2 to the above-mentioned values DCI and DCQ. Outputs from the circuits 24 and 25 are delayed by one bit in the 1-bit delay circuits 26 and 27 respectively, to provide outputs DCI and DCQ. Such processing can be expressed as follows:

$$DCI = DCI2 + DCI' = \alpha * DI5 + DCI' \quad (5)$$

$$DCQ = DCQ2 + DCQ' = \alpha * DQ5 + DCQ' \quad (6)$$

where DCI' and DCQ' respectively denote the preceding offset values DCI and DCQ.

The signal D1 in the radio frequency band, which has been input into the receiving circuit of FIG. 4, is detected by the quadrature-detection circuit 1. The circuit 1 then provides a signal DI2 with respect to I channel and a signal DQ2 with respect to Q channel. In the following discussion, DIn (n is an integer) denotes a signal with respect to I channel, and DQn (n is an integer) is a signal with respect to Q channel.

According to the equations (5) and (6), it is understood that the DC-offset values are obtained by multiplying the latest signal by the coefficient $\alpha$, wherein a DC offset has been eliminated from the latest signal, and then by correcting the preceding DC-offset values depending upon the result.

Hence, the larger the coefficient α, is (for example, α=1), the larger the correction amount becomes in each correction. Likewise, as the coefficient becomes smaller (for example, α=0), the amount of correction also becomes smaller. It is therefore possible to control the follow-up speed by changing the coefficient α.

A demodulating circuit 5 as shown in FIG. 4 demodulates the values DI5 and DQ5 by the use of a predetermined method such as Quadrature Phase Shift Keying (QPSK) or π/4-shift QPSK, to output demodulated signals DI6 and DQ6. The signals DI6 and DQ6 have frame structures as shown in FIGS. 6 and 7.

A frame alignment circuit 6 makes a decision as to whether the signals DI6 and DQ6 contain the alignment portion (UW). The circuit 6 then outputs a signal S3 as an alignment decision result to a signal-end detecting circuit 10, and outputs a frame pulse S4 to both a decoding circuit 7 and a data separating circuit 8. The frame pulse S4 is synchronized with timings of the detected alignment portion (UW).

Initial value of the signal S3 indicating the alignment decision result is "0". The frame alignment circuit 6 continues to detect the alignment portion (UW) when the signal S3 is "0". Once the alignment portion (UW) is detected, the signal S3 becomes "1" at the point immediately after the alignment portion (UW) and remains the state for a period corresponding to the frame. In later steps, the alignment is portion is detected once for each frame. If the alignment portion is detected, the signal S3 remains "1". If not detected, the signal S3 is set to "0", which indicates the signal S3 has returned to an initial state. The frame pulse S4 is output in such a way as it can be positioned at the head of the control portion (CONT).

The decoding circuit 7 decodes the signals DI6 and DQ6 according to a predetermined method such as an error-correction decoding or descrambling. Output D7 from the circuit 7 is passed to the data separating circuit 8 which disassembles the frames in accordance with frame structures as shown in FIGS. 6 and 7. The data separating circuit 8 outputs the control portions (CONT) as D9 to the control circuit 101, the signal-end indication portions (END) as D10 to the signal-end detecting circuit 10 and DATA portions 63 and 73 as D8 to a user. All of the operations of the decoding circuit 7 and data separating circuit 8 are performed on the basis of the frame pulse S4.

The control circuit 101 determines the frame number and which frames should be received, in dependent upon the control portion (CONT) D9 input to the circuit 101. For example, in a case where the frame numbers are cyclic in the order of "0", "1", "2", "3", . . . , "254", "255", "0", "1", . . . , the control circuit 101 keeps receiving the frames 0 to 255 (which is referred to as continuous reception). The control circuit 101 thereby recognizes timings of these frame numbers, and at the same time, stores data as to which frames should be received.

Furthermore, as shown in FIG. 8, in case of receiving the frames "0", "199", "200" and "201", the intermittent reception is performed. In that reception operation, after timings of these frames are recognized, the receive control signal S1 is set to "1" only at the periods corresponding to the frames "0", "199", "200" and "201", while the signal S1 is set to "0" at other frame timings or periods. As described above, the amount of the power consumed in the circuits 1 to 3 takes most of the power consumption in the receiving circuit. This is the reason for adopting the intermittent reception by which the power is turned on only at necessary minimum time intervals.

The signal-end detecting circuit 10 analyzes the signal-end indication portion which is input as D10. As a result of the analysis, the frame-continuation detection signal S2 is set to "1" provided that there are continuing frames and signals are continuously received, while the signal S2 is set to "0" if the signal to be received is ceased. The signal-end detecting circuit 10 thereafter returns the frame-continuation detection signal S2 to "1" when the alignment decision result S3 coming from the frame alignment circuit 6 becomes "1".

As set forth above, the signal-end detecting circuit 10 monitors the results of detection of the UW and signal-end indication in the frame. If the UW of the received frame is detected, the signal S2 is set to "1". If the signal-end indication is detected, the signal S2 is set to "0". Accordingly, the DC-offset eliminating circuit 4 sets the follow-up speed coefficient α to the value of H when the frame-continuation detection signal S2 is "1", and to the value of L when the signal S2 is "0", thereby avoiding a deviation of the DC offset.

Generally, the preamble portion (PA) in the frame structure is formed to have a pattern in which a modulation speed can be emphasized so that the demodulating circuit 5 can regenerate a clock as fast as possible. For example, the preamble data of QPSK has a data structure as shown in Example 1, and can be illustrated on the phase plane as shown in FIG. 9.

EXAMPLE 1

I channel: 101010101010 . . .
Q channel: 101010101010 . . .

With respect to π/4-shift QPSK, the preamble data has a data structure as shown in Example 2, and can be illustrated on the phase plane as shown in FIG. 10.

EXAMPLE 2

I channel: 10110100 10110100 10 . . .
Q channel: 11010010 11010010 11 . . .

As illustrated, in case of QPSK, the preamble pattern on the phase plane exhibits point symmetry with respect to the origin as shown in FIG. 9. In this case, the same DC offset is provided as that of normal data. In case of π/4-shift QPSK, the pattern is asymmetrical with respect to the origin as shown in FIG. 10, the DC offset is therefore deviated compared with that of the normal data.

Specifically, even an accurate DC-offset value is calculated when the normal data is received, the calculation result of the DC offset is brought or deflected in a positive direction of Q channel in response to the reception of the preamble pattern as shown in Example 2. Hence the accurate DC offset can not be maintained for the following data, resulting in inaccurate demodulation and decoding.

Therefore, in the prior-art embodiment, the frame-continuation detection signal S2 is set to "0" at a time of detection of the signal-end indication. The follow-up speed coefficient α is also set to the value of L when the preamble portion (PA) attached to the front position of the head frame of a signal to be subsequently transmitted, thereby avoiding the deviation of DC offset.

On the other hand, the control circuit 101 initially receives all the frames to analyze the control portion (CONT) in each of the frames. After deciding which frames should be received, the control circuit 101 performs the intermittent reception by setting the receive control signal S1 to "1" in response to the frames to be received. However, since the received signal D1 should be received by the plurality of receivers, it is highly possible that any received signal exists after the point B at which the receive control signal S1 is changed to "0". In this case, the conventional receiver can not detect the signal-end indication contained in the frame 15 of FIG. 8. Consequently, the frame-continuation detection signal S2 is not changed to "0" at the point C so that, if the head frame is a frame to be received at the point D, the preamble portion may be received with the follow-up speed coefficient α=H.

More specifically, as shown in FIG. 8, the control circuit 101 recognizes the end of the frame 0 at the point B, therefore, the receive control signal S1 remains "0" until it is reached the point D. At the point C, though the frame 15 containing the signal-end indication is input to the receiving circuit, this indication is not detected. This is because the power to the circuits 1 to 3 is turned off. Therefore, the frame-continuation detection signal S2 remains "1" at the point C. As a result, at the point D, the receiver receives the preamble portion with the follow-up speed coefficient α=H.

Such a problem is inevitable due to the system configuration. If the follow-up speed coefficient α remains the value of H at a time when the preamble portion is received, the DC offset is deviated. This results in a problem of inaccurate demodulation and decoding.

SUMMARY OF THE INVENTION

In view of the foregoing problem, it is an object of the present invention to avoid deviation of a DC offset at a time of receiving a burst signal in which the receive signal starts with a preamble and ends in response to reception of a signal-end indication contained in the last frame located immediately before the end of the receive signal.

According to the present invention, there is provided a receiving circuit with a DC-offset eliminating circuit to find DC-offset values contained in a receiving signal, an A/D converting circuit and previously located circuits so as to automatically eliminate these DC-offset values. In the receiving circuit, the DC-offset eliminating circuit has a variable follow-up speed. The follow-up speed is reduced at a time of receiving a preamble pattern in which a DC offset is deviated from DC-offset values compared with when performing reception of normal data. It is a characterizing feature of the present invention that the deviation of a DC offset from DC-offset values which have been calculated is avoided.

Specifically, the DC-offset eliminating circuit includes means for changing the coefficient α to determine the DC-offset follow-up speed. The circuit changes the coefficient α to a smaller value or 0 in a case where a signal showing a detection that a reception is ceased, is received from a signal-end detecting circuit, or in a case where a signal for partly turning off the circuits for the reduction of power consumption is received from a control circuit, if the received frame is not destined for the receiver itself. The circuit remains the coefficient α to a smaller value immediately after the reception is resumed. Additionally, the circuit returns the coefficient α to the normal value in response to the reception of a signal showing that an alignment signal is detected immediately after a preamble portion. It is possible to reduce the DC-offset follow-up speed as much as possible at the time when the preamble portion is received, thereby avoiding the DC-offset deviation caused by the preamble patterns.

The receiving circuit according to the present invention detects the beginning of the intermittent reception so as to reduce the follow-up speed, even when the intermittent reception prevents the receiving circuit from receiving the signal-end indication due to systematic limitations. As a result, it is possible to avoid the deviation of the DC-offset value caused by the preamble patterns received while the intermittent reception is performed.

BRIEF DESCRIPTION OF THE DRAWINGS

FIG. 2 is a block diagram showing a DC-offset eliminating circuit of the present invention;

FIG. 9 is a diagram showing preamble data on the phase plane with respect to QPSK; and FIG. 10 is a diagram showing preamble data on the phase plane with respect to π/4-shift QPSK.

DESCRIPTION OF THE PREFERRED EMBODIMENT

Figure 1:
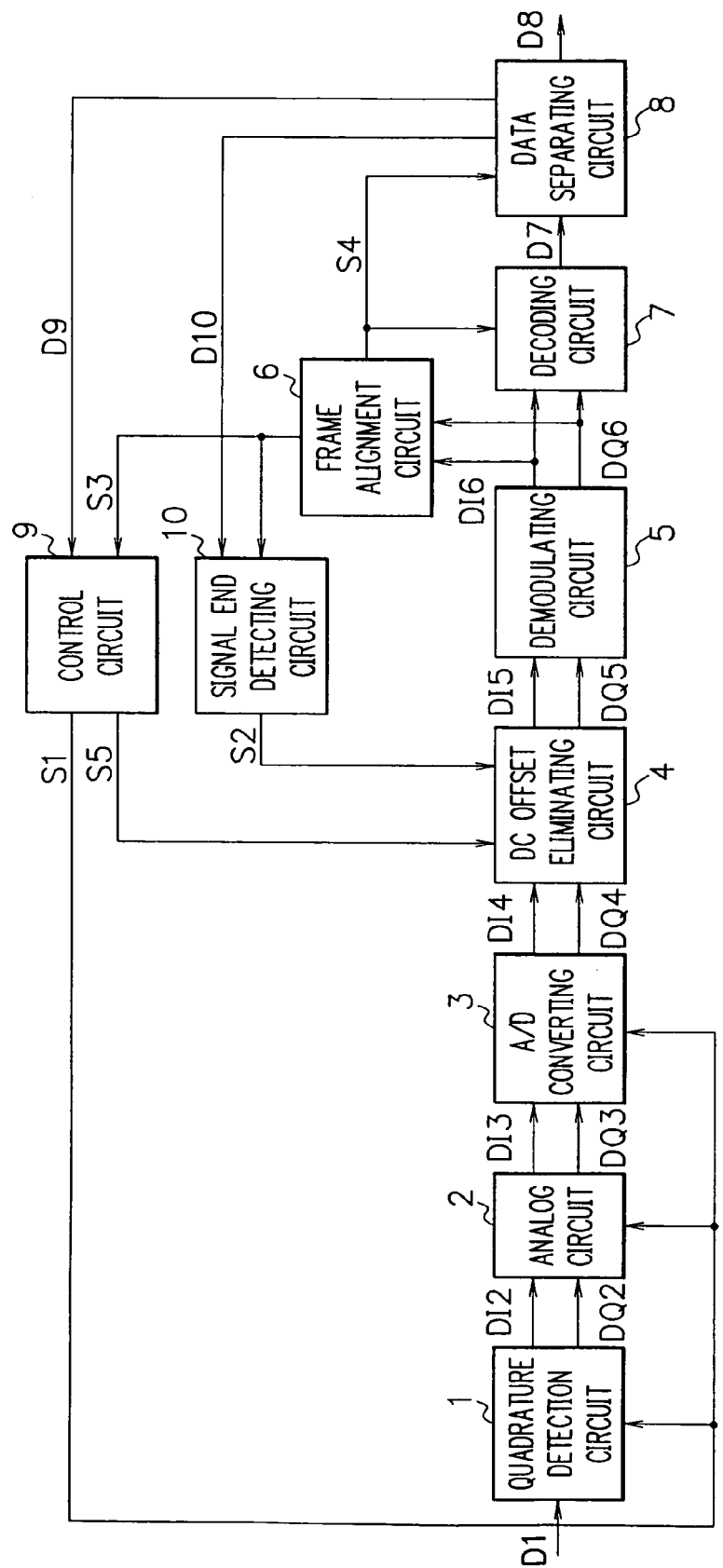
FIG. 1 is a block diagram of a receiver according to an embodiment of the present invention.
Figure 4:
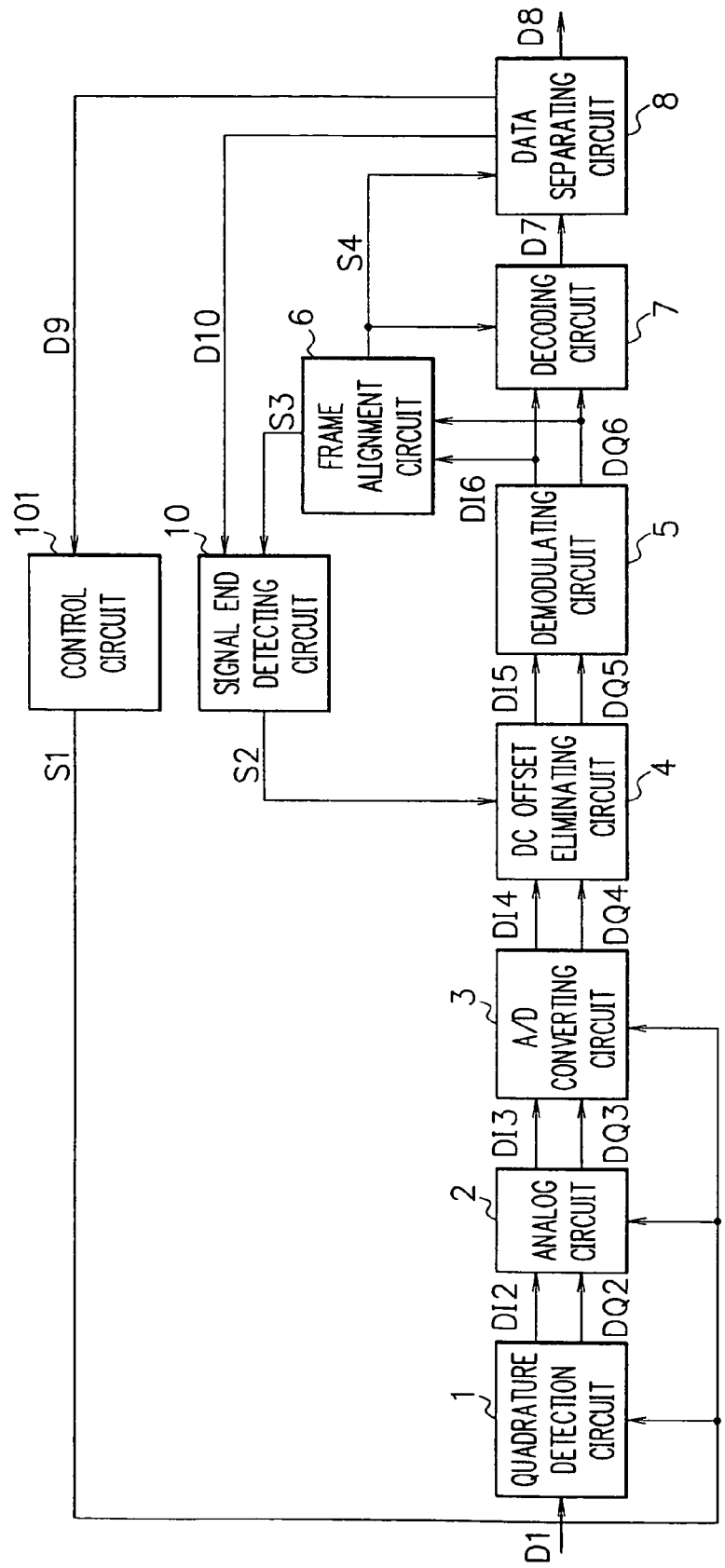
FIG. 4 is a block diagram of a conventional receiver.
Figure 5:
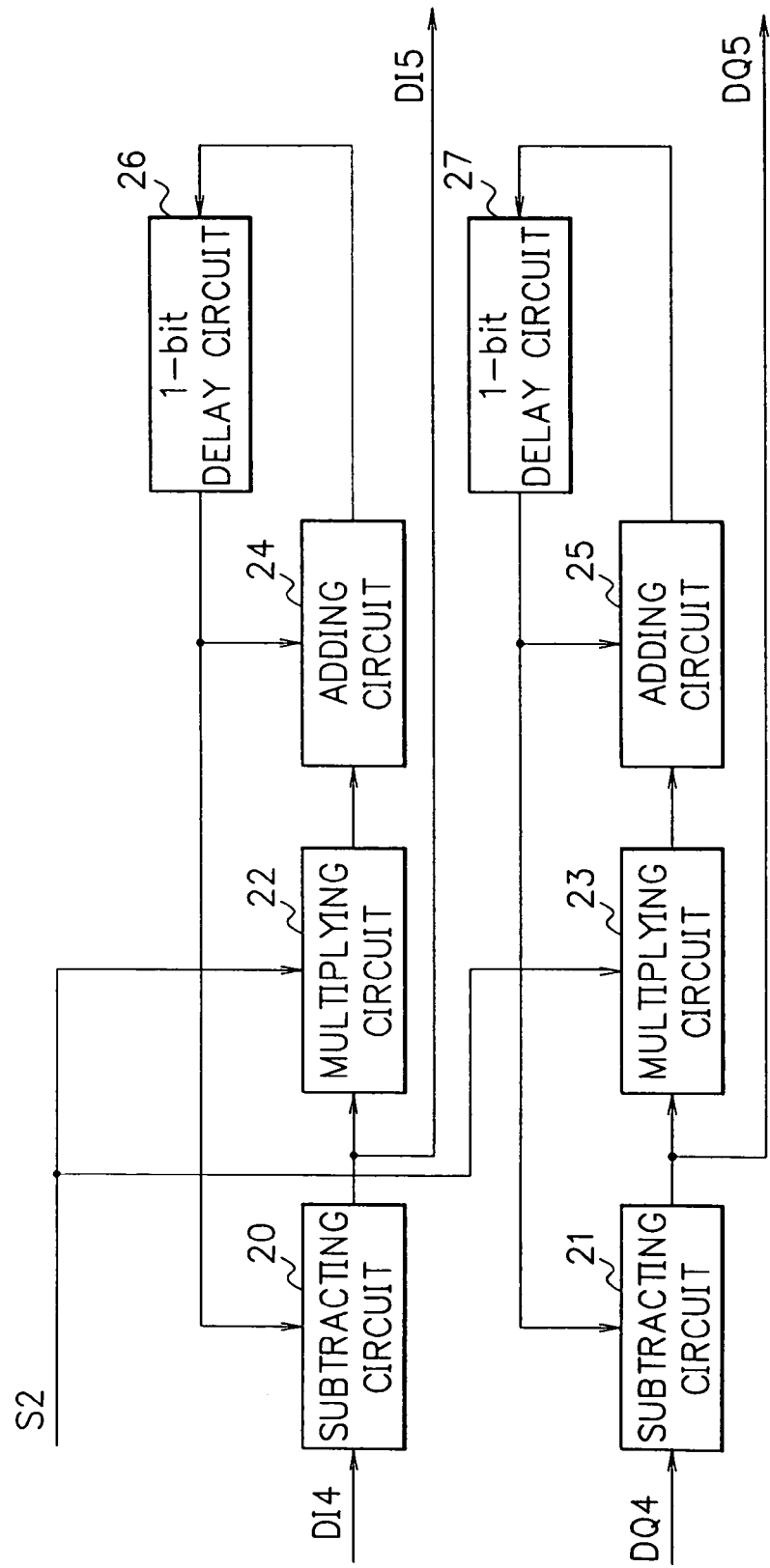
FIG. 5 is a block diagram showing a conventional DC-offset eliminating circuit.

FIG. 1 is a block diagram of a receiver according to an embodiment of the present invention. FIG. 2 is a block diagram illustrating an internal configuration of a DC-offset eliminating circuit 4 as shown in FIG. 1. It should be noted that circuits 1 to 3, 5 to 8, and 10 as shown in FIG. 1 and the operations thereof are identical with those circuits as shown in FIG. 4 with respect to the prior art. Circuits 20 to 27 of FIG. 2 and the operations thereof are also the same as those circuits as shown in FIG. 5 with respect to the prior art.

Figure 6:
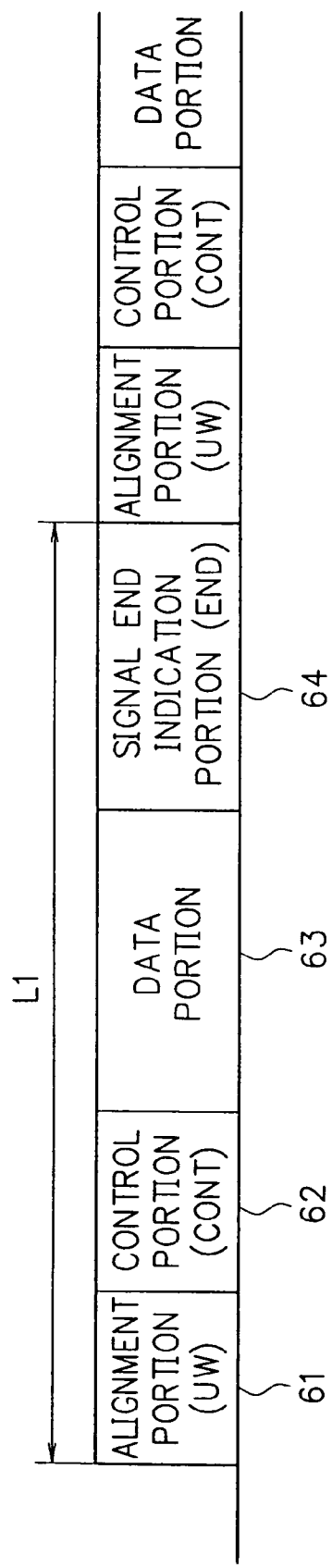
FIG. 6 is a diagram showing a structure of transmitting data.
Figure 7:
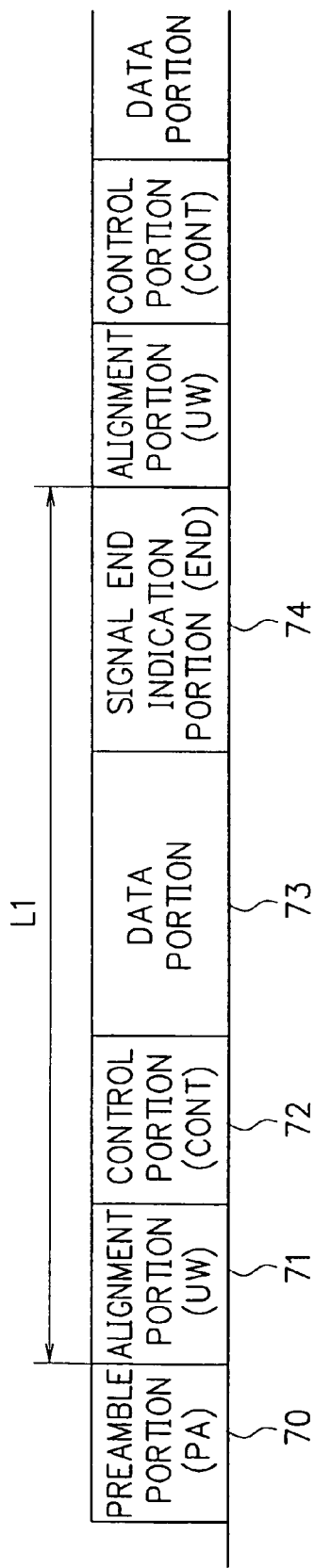
FIG. 7 is a diagram showing a structure of transmitting data.

Furthermore, signals handled in the present embodiment form frame structures as shown in FIGS. 6 and 7. These signals are received by a plurality of receivers.

Each of the receivers initially receives all frames (for example, frames 0 to 255), then a control circuit 9 of the receiver analyzes data D9 associated with a control portion (CONT) of the received frame which has been separated by a data separating circuit 8. With this analysis, the control circuit 9 decides whether or not the frame is destined for itself (one's own receiver). If it is, the frame is stored. Thereafter, the receiver starts an intermittent reception operation to receive the frame only when a receive control signal S1 coming from the control circuit 9 is "1", that is, in a case where the frame is directed to the receiver itself.

As set forth above, an alignment portion of the frame is generally called as a unique word (UW), consisting of 20- to 40-bit fixed patterns which characterize divisions or boundaries of the frames. The control portion (CONT) contains the frame numbers which are cyclic at predetermined intervals and data indicative of which receiver should receive which frame.

A receiving circuit of each receiver, as in the prior art receiving circuit, stores timings at which the frame numbers are cyclic. After the storage operation, the receiving circuit turns on the power supplied to a quadrature-detection circuit 1, an analog circuit 2 and an analog/digital (A/D) converting circuit 3, by setting a receive control signal S1 to "1" only at the frame timing to perform a receiving operation. At other frame timings, the receiving circuit sets the signal S1 to "0" to perform intermittent reception, that is, the receiving circuit turns off the power to the circuits 1 to 3 in order to realize reduction in the power consumption in the receiving circuit.

For the reduction in the power consumption, it is assumed in the present embodiment that data is exchanged at a transmitting side and a satellite if data is transmitted via the satellite, only when there exists significant data, otherwise, no data is exchanged. Consequently, the above-mentioned activation method is employed, where the intermittent reception is carried out at regular time intervals, while a signal D1 is input into the receiving circuit of FIG. 1 at irregular time intervals.

The quadrature-detection circuit 1 carries out a quadrature detection at a predetermined radio frequency, on the received signal D1 in the radio frequency band, and converts the signal D1 into signals DI2 and DQ2 in the baseband frequency band. The analog circuit 2 then converts the signals DI2 and DQ2 into signals DI3 and DQ3 respectively, which are suitable for the subsequent A/D converting circuit 3. The AID converting circuit 3 performs conversion of the analog signals DI3 and DQ3 into digital signals DI4 and DQ4 respectively, to output the results to a DC-offset eliminating circuit 4.

Subtracting circuits 20 and 21 in DC-offset eliminating circuit 4 subtract from the signals DI4 and DQ4, DC offset values DCI and DCQ which are respectively output from 1-bit delay circuits 26 and 27. The subtracting circuits output signals DI5 and DQ5 on which a DC-offset elimination has been performed in accordance with the above equations (1) and (2)

In an AND circuit 28, a received frame signal S5 (which will be described below) coming from the control circuit 9 and a frame-continuation detection signal S2 input from the signal-end detecting circuit 10 are ANDed (the AND circuit 28 outputs "1" only when the signals S2 and S5 are "1"). The result of the AND operation, S20, is output to the multiplying circuits 22 and 23. These circuits then execute calculations as shown in the above expressions (3) and (4).

As in the prior art, the multiplying circuits 22 and 23 have two types of values H and L (H>L) as the follow-up speed coefficient α. When the signal S20 is "1", α=H will hold, which causes the follow-up speed to be increased. When the signal S20 is "0", α=L, so that the follow-up speed is decreased.

Adding circuits 24 and 25 add DCI2 and DCQ2 to the above-mentioned values DCI and DCQ, respectively. Outputs from the circuits 24 and 25 are delayed by one bit in the 1-bit delay circuits 26 and 27 respectively, to provide outputs DCI and DCQ as shown in the above equations (5) and (6).

According to the equations (5) and (6), DC-offset values are obtained by multiplying the latest signal by the coefficient α, wherein a DC offset has been eliminated from the latest signal, thus with this result, correcting the preceding DC-offset values. Hence, the larger the coefficient α is (for example, α=1), the larger the correction amount becomes in each correction. Likewise, as the coefficient becomes smaller (for example, α=0), the amount of correction also becomes smaller. It is therefore possible to control the follow-up speed by changing the coefficient α.

A demodulating circuit 5 demodulates the values DI5 and DQ5 by the use of a predetermined method such as Quadrature Phase Shift Keying (QPSK) or π/4-shift QPSK, to output demodulated signals DI6 and DQ6. The signals DI6 and DQ6 form frame structures as shown in FIGS. 6 and 7.

A frame alignment circuit 6 makes a decision as to whether the signals DI6 and DQ6 contain an alignment portion (UW). This circuit 6 then outputs a signal S3 as an alignment decision result to the control circuit 9 and a signal-end detecting circuit 10, and outputs to both a decoding circuit 7 and data separating circuit 8 a frame pulse S4 in synchronization with timings of the detected alignment portion.

Initial value of the signal S3 indicating the alignment decision result is "0". At this time, the frame alignment circuit 6 continues to detect the alignment portion. Once the alignment portion is detected, the signal S3 becomes "1" at the point immediately after the alignment portion and remains the state for a period corresponding to the frame. In later steps, the alignment portion is detected once for each frame. If the alignment portion is detected, the signal S3 remains "1". If not detected, the signal S3 is set to "0", which indicates the signal S3 has returned to an initial state.

The frame pulse S4 is output so that it can be positioned at the head of the control portion. The decoding circuit 7 decodes the signals DI6 and DQ6 according to a predetermined method such as an error-correction decoding or descrambling. Output D7 coming from the circuit 7 is passed to the data separating circuit 8.

The data separating circuit 8 disassembles the frames in accordance with frame structures as shown in FIGS. 6 and 7. The data separating circuit 8 outputs the control portion (CONT) as D9, to the control circuit 9, the signal-end indication portion (END) as D10, to the signal-end detecting circuit 10, and a DATA portion as D8, to a user. All of the operations of the decoding circuit 7 and data separating circuit 8 are performed on the basis of the frame pulse S4.

The control circuit 9 determines the frame number and also determines which frames should be received, in accordance with the control portion D9 input to the circuit 9. For example, in a case where the frame numbers are cyclic in the order of "0", "1", "2", "3", . . . , "254", "255", "0", "1", . . . , the control circuit 9 keeps receiving the frames 0 to 255. The control circuit 9 thereby recognizes timings of these frame numbers, and at the same time, stores data as to which frames should be received.

For example, if it is determined that the frames "0", "199", "200" and "201" correspond to the receiving timings of the receiver, the intermittent reception is performed. More specifically, after timings of these frames are recognized, the receive control signal S1 is set to "1" only at the periods corresponding to the frames "0", "199", "200" and "201", while the signal S1 is set to "0" at other frame timings or periods.

Furthermore, the control circuit 9 outputs the received frame signal S5 to the DC-offset eliminating circuit 4. The received frame signal S5 becomes "1" only when the receive control signal S1 is "1" and concurrently the alignment decision result S3 output from the frame alignment circuit 6 is "1". Otherwise, the signal S5 becomes "0".

The signal-end detecting circuit 10 analyzes the signal-end indication portion which is input as D10. As a result of the analysis, the frame-continuation detection signal S2 is set to "1" provided that there are continuing frames and signals are continuously received, while the signal S2 is set to "0" if the signal to be received is ceased. The signal-end detecting circuit 10 thereafter returns the frame-continuation detection signal S2 to "1" when the alignment decision result S3 from the frame alignment circuit 6 becomes "1".

Figure 3:
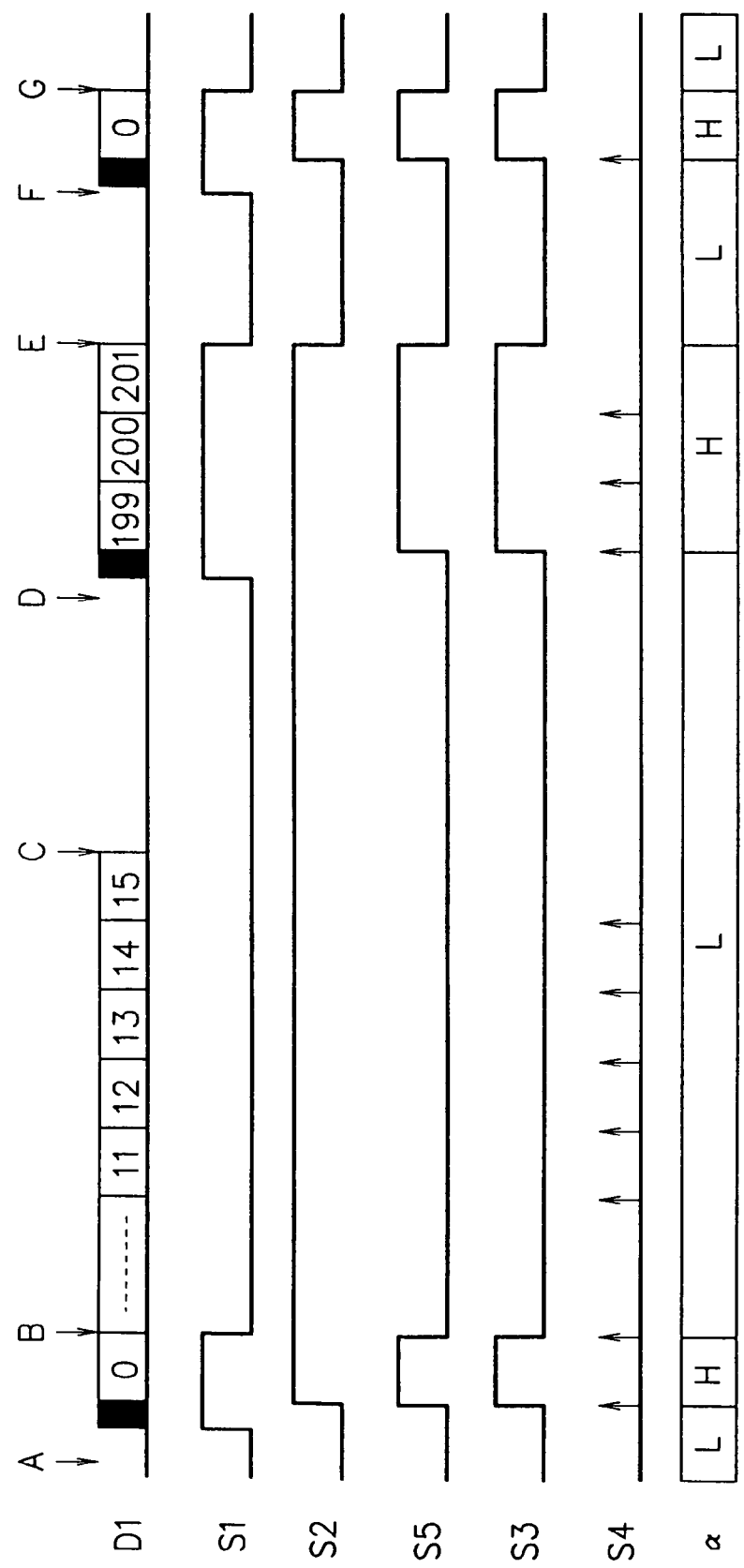
FIG. 3 is a time chart for describing the operation of the present invention.

A description will now be given of the operation of the embodiment with reference to the timing chart of FIG. 3. It is assumed that the receiving circuit according to the present embodiment receives only the frames 0, 199, 200, and 201 through the intermittent reception. The input signal D1 is input according to the activation method, and black portions in the signal D1 correspond to the preamble portion. Signal-end indications (END) are provided in the frames 0, 15, and 201.

With respect to the point A, the point is located at the head of the frame for which the reception operation is resumed, however, the receiving circuit recognizes the point A as a timing at which the frame 0 should be received. The receive control signal S1 is therefore changed from "0" to "1" at the point A, the receiving circuit then receives the frame 0. At the same time, the received frame signal S5 output from the control circuit 9 is changed from "0" to "1" at a time when the alignment decision result S3 becomes "1". Furthermore, the signal-end detecting circuit 10 detects the alignment decision result S3 indicating "1", which triggers the frame-continuation detection signal S2 to become "1".

As mentioned above, the output S20 from the AND circuit 28 becomes "1" only when both the frame-continuation detection signal S2 and received frame signal S5 are "1". Therefore, the coefficient α for determining a DC-offset follow-up speed in the DC-offset eliminating circuit 4 takes the value of L when receiving the preamble portion attached to the front-end of the frame 0, as shown in FIG. 1. After the preamble reception, the value of the coefficient α is H.

At the point B, the control circuit 9 recognizes the end of the frame 0 so that the receive control signal S1 and received frame signal S5 are set to "0". Because of this, the coefficient α which determines the DC-offset follow-up speed in the DC-offset eliminating circuit 4 is set to the value of L.

At the point C, the frame 15 containing the signal-end indication (END) is input to the receiving circuit. However, this is not a receiving timing for the receiver so that the receive control signal S1 remains "0", which causes the power supplied to the circuits 1 to 3 to be turned off. Thus, the signal-end indication contained in the frame 15 is not detected by the receiving circuit, and the frame-continuation detection signal S2 remains "1".

At the point D, as in the case at the point A, the receive control signal S1 is changed from "0" to "1", and the power to the circuits 1 to 3 is turned on to resume the receiving operation. Since the received frame signal S5 is "0" at a time of receiving the preamble portion, the frame-continuation detection signal S20 is also "0". The coefficient α therefore remains the value of L. At a time when the alignment portion of the frame 199 is detected, the alignment decision result S3 becomes "1". The received frame signal S5 also becomes "1". As a result, the frame-continuation detection signal S20 becomes "1", which causes the coefficient α to take the value of H.

At the point E, the end of the frame 201 and the signal-end indication are detected, therefore both the receive control signal S1 and received frame signal S5 become "0", and the frame-continuation detection signal S2 also becomes "0". As for the operation at the point F, similar to that at the point A, the control is so made that the coefficient α takes the value of L when the preamble portion is received.

Figure 8:
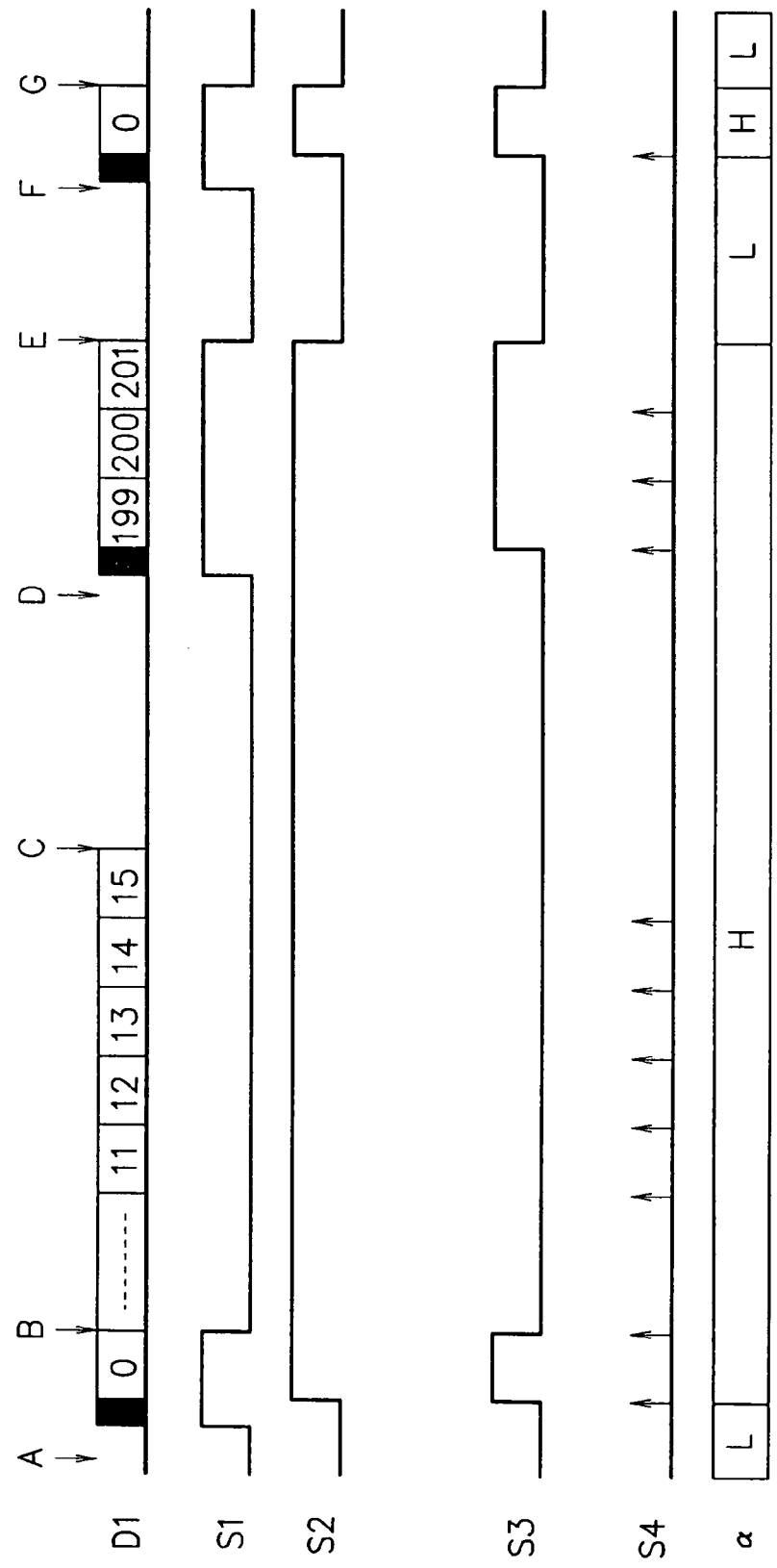
FIG. 8 is a time chart illustrating the operation of the prior art receiver.

In the prior art method, the signal-end indication (END) is not recognized at the point C as shown in FIG. 8 when the intermittent reception is being performed. Therefore, the coefficient α remains the value of H when the preamble portion is received at the point D. Consequently, the DC offset is deviated at the position where the next frame, the frame 199, is located. This results in degradation in the quality of reception operation.

The present invention can solve the aforementioned problems. In the present invention, when the intermittent reception is performed, the control is so made that the coefficient α is assured to take the value of L before starting reception of the preamble portion. It is therefore possible to avoid the deviation of DC offset at a time when the preamble portion is received at the point D.

What is claimed is:

1. A DC-offset eliminating method for a receiving circuit of a receiver which receives signals comprising a plurality of frames continuously sent to the receiving circuit, each of the frames comprises an alignment portion and a signal-end indication portion showing as to whether other frames continuosly follow said frames and a preamble portion added only at the head of each single frame or each group of frames, wherein the method comprises:
   calculating a DC-offset component depending upon the received signals;
   subtracting said DC-offset component from the received signals; and
   performing a DC-offset eliminating operation based on the subtracted result, wherein a reduction in DC offset follow-up speed is initiated when said preamble portion is being received, regardless of a time when a continuous reception is performed in which all of said frames are received to recognize the timing of the frame number to be received or a time when an intermittent reception is executed in which only a frame destined for said receiver itself is received, said DC-offset eliminating operation changing said DC-offset follow-up speed in accordance with a frame-continuation detection signal and a received frame signal.

2. The DC-offset eliminating method according to claim 1, wherein said DC-offset eliminating operation changes said DC-offset follow speed based on a signal obtained by the logical AND operation performed on said received frame signal, which changes according to said alignment portion detected from the received frames, and said frame-continuation detection signal, which changes according to a signal end detected in said signal-end indication portion.

3. The DC-offset eliminating method according to claim 2, wherein said DC-offset follow-up speed is associated with a predetermined follow-up speed coefficient which takes one of two values, 0 or a positive value.

4. A receiving circuit for eliminating a DC offset comprising:
   a detecting circuit for selectively receiving and detecting signals configured by a plurality of frames which are continuously sent to the receiving circuit, each of said frames comprising an alignment portion, a control portion providing indications of the frame number cyclic at predetermined intervals and of which receiver should receive the frame number, and a signal-end indication portion showing as to whether other frames continuously follow said frames, and a preamble portion is added at the head of each frame;

an analog to digital (A/D) converting circuit for converting said detected signals into digital signals;

a DC-offset eliminating circuit for eliminating a DC-offset component from said converted digital signals;

a demodulating circuit for demodulating said frames from said digital signals from which the DC-offset component has been eliminated;

a control circuit for determining the frame number and which frames should be received, depending upon information input from said control portion so as to turn on the power to said detecting circuit and said A/D converting circuit, thereby outputting a control signal for instructing to receive an appropriate frame, and for outputting to said DC-offset eliminating circuit a received frame signal showing that said appropriate frame is being received, depending upon information contained in said alignment portion in the received frames; and an signal-end detecting circuit for outputting a frame-continuation detection signal to said DC-offset eliminating circuit by monitoring said information contained in said alignment portion and information contained in said signal-end indication in the received frames, wherein said DC-offset eliminating circuit comprises:

a subtracting circuit for eliminating a DC offset by subtracting a calculated DC-offset value from said digital signals, and for outputting the result to said demodulating circuit;

a multiplying circuit for multiplying said output from said subtracting circuit by a coefficient H or L (0<L<H);

an adding circuit for adding said calculated DC-offset value to an output from said multiplying circuit;

a 1-bit delay circuit for delaying an output from said adding circuit by one bit to output said calculated DC-offset value; and an AND circuit for performing logical AND operation on said received frame signal input from said control circuit and said frame-continuation detection signal input from said signal-end detecting circuit, wherein said DC-offset eliminating circuit selects any one of said coefficients H and L depending upon an output from said AND circuit.

5. The receiving circuit according to claim 4, wherein said coefficient L takes the value of 0, and said coefficient H takes the value of 1.

* * * * *